United States Patent
Xu et al.

(10) Patent No.: US 11,674,887 B2
(45) Date of Patent: Jun. 13, 2023

(54) APPARATUS AND METHOD FOR TESTING DYNAMIC SEALABILITY OF FLUID IN THE DOWNHOLE MINOR LEAKS

(71) Applicants: Zhejiang Ocean University, Zhejiang (CN); Yangtze University, Hubei (CN)

(72) Inventors: Lin Xu, Zhoushan (CN); Xiaohe Huang, Zhoushan (CN); Yue Huang, Zhoushan (CN); Mingbiao Xu, Zhoushan (CN); Yingying Guo, Zhoushan (CN); Huanzhi Feng, Zhoushan (CN); Xijin Xing, Zhoushan (CN); Li Xu, Zhoushan (CN); Lang Wang, Zhoushan (CN)

(73) Assignees: ZHEJIANG OCEAN UNIVERSITY, Zhejiang (CN); YANGTZE UNIVERSITY, Hubei (CN)

(*) Notice: Subject to any disclaimer, the term of this patent is extended or adjusted under 35 U.S.C. 154(b) by 0 days.

(21) Appl. No.: 17/388,126

(22) Filed: Jul. 29, 2021

(65) Prior Publication Data
US 2023/0032805 A1 Feb. 2, 2023

(51) Int. Cl.
*G01N 19/04* (2006.01)
*E21B 47/117* (2012.01)

(52) U.S. Cl.
CPC ............ *G01N 19/04* (2013.01); *E21B 47/117* (2020.05)

(58) Field of Classification Search
CPC .............................. G01N 19/04; E21B 47/117
USPC ... 73/150 A, 150 R, 40, 49.8, 152.57, 865.6, 73/866; 156/64, 378
See application file for complete search history.

(56) References Cited

U.S. PATENT DOCUMENTS 3,194,310 A * 7/1965 Loomis .................. E21B 29/10
166/250.08

FOREIGN PATENT DOCUMENTS

CN 212483286 U * 2/2021
GB 2382365 A * 5/2003 ......... E21B 33/1212

* cited by examiner

*Primary Examiner* — Robert R Raevis
(74) *Attorney, Agent, or Firm* — Sughrue Mion, PLLC

(57) ABSTRACT

A method and apparatus for determining the sealability of an oil & gas well sealant fluid, whereby a cylindrical cell assembly capable of withstanding high temperature and high pressure with an electromagnetic heater positioned radially outside the cell body while partly filled with the sealant fluid. A leakage assembly in connection to the cylindrical cell assembly allows the sealant fluid to continuously flow through a leakage element at a desired differential pressure, and the residual fluid is drained into said cell by a cycling pipeline system. The real-time pressure may be recorded and transmitted to a control system including data acquisition and control units so as to monitor and measure the sealability of fluid in the downhole leakage.

11 Claims, 5 Drawing Sheets

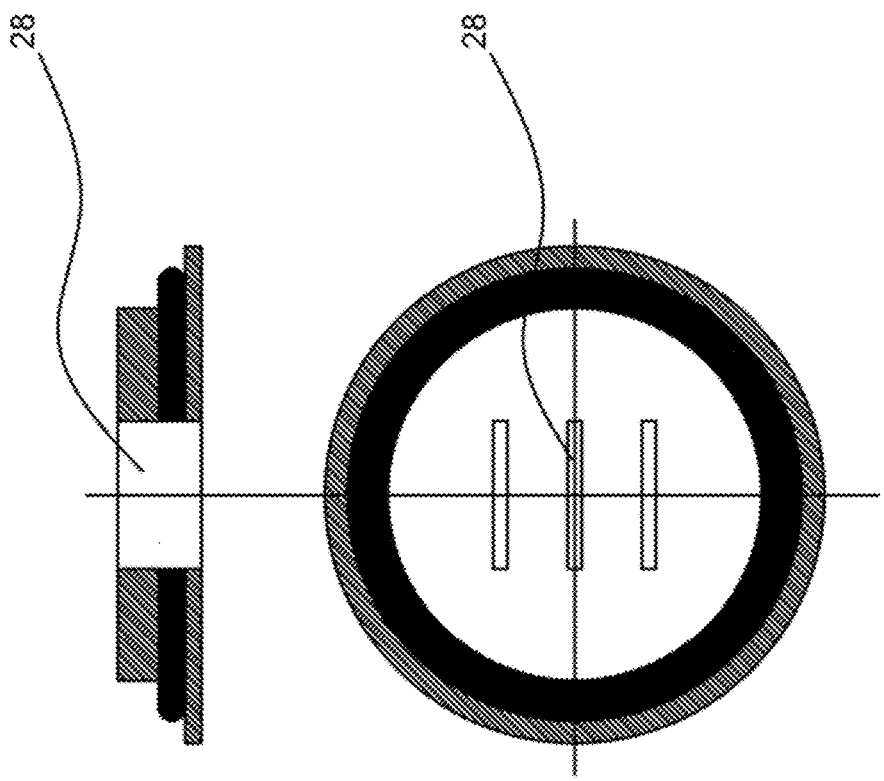
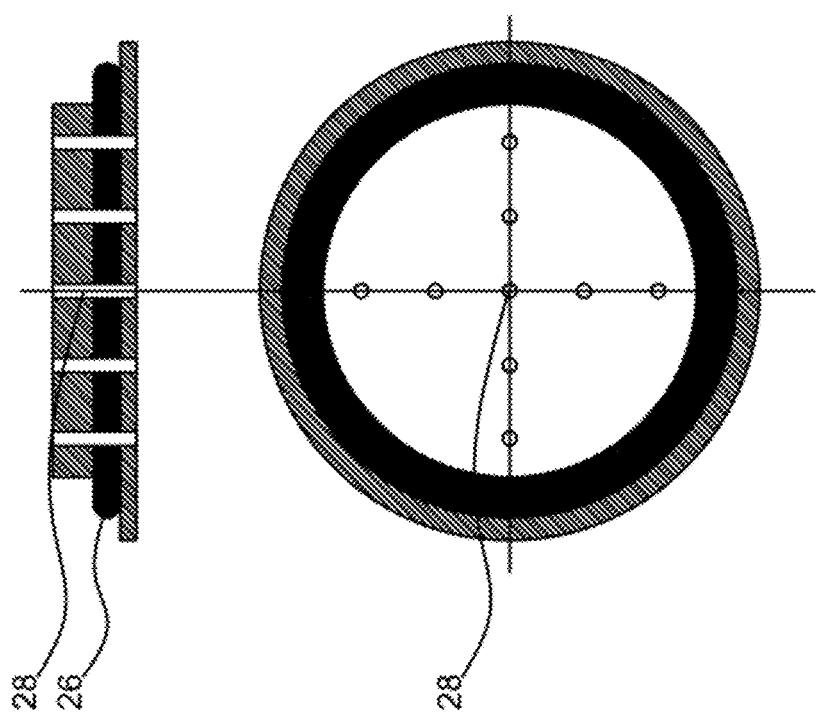
FIG.2

APPARATUS AND METHOD FOR TESTING DYNAMIC SEALABILITY OF FLUID IN THE DOWNHOLE MINOR LEAKS

TECHNICAL FIELD

The present invention relates to apparatus for measuring and analyzing the plugging property of sealant fluid in borehole minor defects, particularly for testing liquid sealant for use in oil & gas production, and methods.

BACKGROUND

Wellbore assembly is a complex system comprised of tubing, tubing head, casing, casing head, cement stone, packers, bottomhole safety components and control pipelines, which is thus important to ensure well integrity for a continuous production. As progress of oil and gas production, wellbore assembly invalidation such as damage, abrasion, and leakage is inevitable, due to a long-term experience in harsh downhole environment, especially large liquid column pressure, friction, and alternate load. Particularly in the later half period of the oil and gas fields, minor leakages of borehole assembly can cause variant production problems, for example, integrity failures of sustained casing pressure (SCP), loss of control and well shut-in with economic losses, and risks to safety and environment. Curing leaks of wellbore assembly should be the most effective to restore the wellbore integrity. Therefore, apparatus of testing seal repairs and leak scale is confirmed to be essential in determining the sealing method and evaluating the final repairing effect.

CN201555697U describes a method and apparatus for testing the leakage of drilling fluids through the permeable formation at high pressure. The test is accomplished by controlling sealant pressure and flow in an autoclave comprised of heater and core samples, wherein the high pressure (up to 2.0 MPa) can be implemented with a pressurization pump. This design is specially intended to simulate the formation leakage within downhole conditions. This limits the test parameters that can be specified to a relatively narrow range. For example, the leakage of wellbore strings such as casing, tubing, packers etc. can not be simulated and tested. Similarly, CN204738806U also describes a method and apparatus for blockage test. This apparatus employs a visual tank combined with a leakage element to stimulate formation filtration. A $N_2$ source is applied to pressurize. Obviously, this device should be very limited in simulating downhole leak environment, due to a lack of heater and effective pressurization unit.

CN206016761U describes a visualized downhole blockage testing machine in which plugging property of sealant fluid or other functional fluids may be tested by a pressure-resistant and transparent cylinder filled with the specially prepared sand bed. The transparent cylinder is installed in a truss type chassis, which can rotate around the fixed point to simulate well deviation. The plugging pressure can be increased up to 7 MPa, and the plugging process at one angle can be implemented by varying the fixed angle of the cylindrical cell around the fixed point. While again limiting the testing apparatus to examining only the formation leakage, this device limits the possible specimen types which might be made up of sand and rock. In addition, a lack of heater can heavily limit its simulation on downhole elevated temperatures.

The fact that development of some novel sealants and appearance of more complex leakage types have a significant impact on the blockage testing apparatus can result in abnormal requirements on plugging tests. The main limits of liquid sealability testing apparatus previously applied are given as follows:

1. The previously developed plugging testers are comprised of the basic cylindrical pressure cell filled with the sand bed sample. While the sealants flow through sand bed sample, the permeable formation will be plugged by the sealant fluids, and then the plugging property of sealant can be tested in the specially prepared formation. Note that, the plugging process probably involves a large volume of sealants and, in this case, plugging tests can not be completely performed due to a limited cell volume. As for the previous plugging tests, a batch supplement of sealants is thus necessary in order to effectively plug sample formation. Undoubtedly, this addition treatment will inevitably interrupt the plugging process, especially for dynamic pressure variation, which can go against the plugging evaluation and analysis.

2. The previously developed plugging testers were developed to test plugging property of sealants in filtrate formation, which thus appear to be relatively limited in testing the plugging property related to leakage of borehole assembly, including dynamic and static seals (e.g., SCSSVs, valve control systems, tubing, casing, valve, packers, hangers and similar components).

3. The previously developed plugging testers control the pressure and temperature by simple gas source and an electric heater. The pressure range is lower than 7 MPa; and the steady temperature condition is very difficult to obtain in a long-term plugging test, both of which can seriously influence the testing accuracy. As for previously developed plugging testers, meanwhile, a deficiency of automation makes plugging tests more complicated and time-consuming.

SUMMARY

It is an object of this invention to create a device which can measure plugging property of sealant across leakage of borehole assembly. Using the designed device, a set of elevated temperature (up to 150° C.) and elevated pressure (up to 25 MPa) can be produced to simulate the downhole environment, and a continuous plugging test can be realized by circulating sealants with help of a pressurization pump; dynamic plugging behavior of sealants happened at the leak site can be visualized, and real-time record of differential pressure variation can be provided, to disclose the liquid-solid jamming transition of sealant fluid and examine the final plugging property.

This invention provides a plugging tester for measuring and analyzing the plugging property of sealant fluids in a set of simulated leakage assembly, a cylindrical cell assembly, and a cycling pipeline system.

The said leakage assemblies contain an upper cap 11 and a bottom cup 8.

The said upper cap 11 has an inlet of sealant fluids and a pressure sensor. The sealant fluids can flow through the inlet under a certain differential pressure.

The said upper cap 11 is screwed to a leakage element 22.

The said leakage element 22 is typically designed with leak pores 28. The leak pores 28 come in a variety of sizes, geometries, and array to simulate leak path of borehole minor-defects.

The bottom cup 8 is a cylindrical and transient component, and is attached to the upper cap 11 via a thread.

The said bottom cup 8 is fixed to the inside end of upper cap 11 via a thread, and the down hole of the bottom cup 8 is axial with leakage element 22 and retainer 23.

The sealant fluids can flow through the cup hole and the sample leakage pore to a cylindrical cell 6.

The said bottom cup 8 is transient and pressure-resistant, and is made of transient quartz glass, which will not only enhance temperature and pressure resistance but also enable the visualization of dynamic plugging process The said leakage element 22 is screwed onto the lower end of the upper cap 11 by the retainer 23

The said retainer 23 is attached onto the upper cap 11 via a thread.

A flow meter 7 is fixed below the said leak assemblies to provide velocity data of flow across the bottom cup 8.

The said cylindrical cell assembly consists of a cylindrical cell 6, a cover 29, and an electromagnetic heater 15.

The said cylindrical cell 6 has two inlets in the upper, which separately allow overflow fluid and sealant fluid across leakage assembly to return.

The said cell 6 has one outlet in the bottom, which is contacted with a pressurization pump 3 by a stop valve 4.

The said cover 29 is screwed onto the cell body 30 via a thread. An O-ring assures against leakage through the thread.

The said electromagnetic heater 15 is positioned radially outside said cell 6.

The said pressurization pump 3 connects to a valve 2, which is further connected to the said leakage assemblies by a stop valve 10. As a result, a set of cycling device involving leakage assemblies, cylindrical cell, and control elements is effectively constructed, through which a continuous plugging test can be carried out.

Flow velocity of sealant fluid can be adjusted by the pressurization pump 3 and, further, the required pressure in simulating leak sites can be obtained by control of flow velocity.

A check valve 5 is arranged before the cylindrical cell 6 to allow the redundant sealant flow back.

A pressure gauge 1 is arranged at the cycling pipeline between the leakage assemblies and the first stop valve 2 to record and adjust the injected pressure.

The third stop valve 10 is arranged before the leakage assemblies, and it can cooperatively work with the first stop valve 2 to control the injected pressure of sealant fluids. Once the experimental pressure is arrived, then the third stop valve 10 is opened to allow sealant fluid flow across leakage assemblies. Subsequently, sealant plugging process can be recorded and inspected in the panel 19.

The cycling pipeline is arranged with four stop valves to control the flow state.

An electromagnetic heater 15 is positioned radially outside the cell body to provide an efficient temperature control.

To perform a run of the testing apparatus automatically, a temperature sensor 12, a pressure sensor 17, the flow meter 7, and the pressurization pump 3 are all connected to a control panel 19 by a set of data wires such as a temperature data wire 16 and a pressure data wire 19.

The said panel 19 that is basically the combination of a data acquisition system and an operation control software is connected to the apparatus to adjust the pressurization pump, vary temperature and pressure, record the real-time pressure data, and inspect the pressure variation linked with plugging process.

The said leakage assembly is connected with the cell body 30 by the cycling pipeline. Sealant fluid is continuously pumped through the leakage assemblies and then return to the cell body 30 until the seal succeeds. During the migration of sealant, a special sealing reaction occur and bridge across the leak due to the differential pressure. That is, there is a cross-linking reaction analogous to blood coagulating at a cut. As the reaction proceeds, the polymerized sealant plates out on the edges of the leak site and, simultaneously links across the leak site to seal the leak. The resulting seal is an elastic bond across the leak. The formation of elastic seal that is closely related to the plugging process can be directly observed by the transient quartz cup 8 specially prepared. Meanwhile, the real-time data of pressure variation that can reflect the plugging behavior is collected and recorded on the panel 19.

It is also an object of the present invention to provide a method for determining the plugging property of sealant fluid in the borehole leakage. The process and principle are as follows:

1. Pour sealant fluid into the cell body 30. Screw the cover 29 onto the cell 30 via thread. Adjust the fluid temperature as desired by activating heater 15. Keep the valve 10 and 14 closed and other valves (e.g., valve 2, 4 and 5) open. Use the pressurization pump 3 to make the sealant flow in the cycling pipeline. Adjust the flow rate and control the pressure so that the pressure reaches the predetermined value.

2. Open the valve 10 and 14. Allow the sealant flow through the leakage assembly under the predetermined pressure value to return into the cell body 30. Record the flow rate of sealant by flow meter 7.

3. As the sealant fluid circulates, a seal solid will be formed across the leak site and, in this case, the pressure prior to the leak assembly will inevitably increase. The pressure data can be measured and transferred by the pressure sensor 17 to the control panel 19. Once the recorded pressure becomes stable, then an effective plug can be established along the leak path, which means a successful seal repair. If pressure data continuously vary, the test cycle can be properly increased to extend the plugging period until the stale pressure value reaches. In fact, the plugging time in testing process can reflect the plugging capability of sealant.

4. The plugging property of sealant fluids can completely be examined by analyzing the real-time pressure data with a professional software. Besides, the leakage element 22 can be taken out from the leakage assembly, so as to directly investigate the characteristic of seal formed in the leak path. Therefore, the plugging process closely related to the liquid-solid transmission of the sealant fluid can be effectively evaluated by the visual cup 8. Note that, the pressure can be further reinforced by adjusting the pressurization pump to measure the pressure-bearing capability of the seal formed across the leaks.

5. While the plugging test is complete, close the temperature power and make the cell temperature decrease to the ambient temperature. Drain the sealant fluid from the cylindrical cell, and then inject the flush into the cell to clean the device by circulating the flush fluid.

The described invention may address several key problems in modeling downhole plugging process which are not addressed by prior devices.

The present invention is tightly closed with test of plugging property of sealant fluids in different borehole seal leaks. Leak sizes and geometries are taken into consideration, so as to simulate the potential leakage that have been observed in dynamic and static seals on-site. The pressurization pump 3 and electromagnetic heater 15 are incorporated into this invention. In combination to the pressure-resistant and temperature-resistant transparent cup 8, the rapid and stable control of temperature and pressure can be realized, together with data acquisition system and control software. Simultaneously, the sealant fluid can be dynamically circulated to enable the continuous plugging test. In addition, the dynamic plugging process of liquid-solid jamming transmission for sealants can be completely visualized. The real-time pressure can be recorded and analyzed, which can be used to accurately describe plugging property of sealant fluid across the leak.

BRIEF DESCRIPTION OF THE DRAWINGS

Other objects, features and advantages will be clear from the following detailed description of the preferred embodiment taken in conjunction with accompanying drawings in which:

FIG. 2 is a set of cross-section and top views of leakage element 22 (left: pores; right: crack) in FIG. 1

REFERENCE NUMERALS IN DRAWINGS

1—pressure gauge; 2—first stop valve; 3—pressurization pump; 4—second stop valve; 5—check valve; 6—cylindrical cell, 7—flowmeter; 8—bottom cup; 9—leakage assembly; 10—third stop valve; 11—upper cap; 12—pressure sensor; 13—flow sensor; 14—fourth stop valve; 15—heater; 16—control wire; 17—temperature sensor; 18—temperature data wire; 19—panel; 20—screen; 21—pressure data wire; 22—leakage element; 23—retainer; 24—first O-ring; 25—first snap ring; 26—second O-ring; 27—second snap ring; 28—leakage pore; 29—cover; 30—cell body; 31—fluid feeding pipeline; 32—overflow pipeline; and 33—fluid return pipeline.

DETAILED DESCRIPTION OF ILLUSTRATIVE EMBODIMENTS

The primary embodiment of the invention can be best understood by reference to this specification and to the appended drawings.

Figure 1:
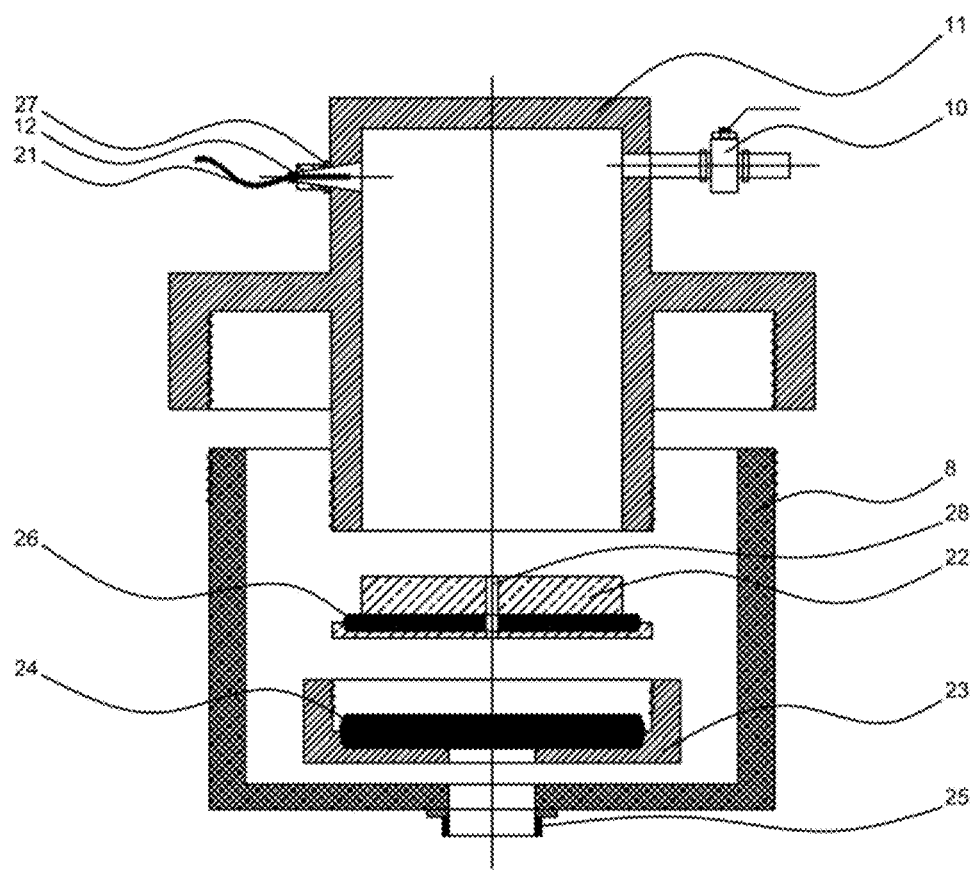
FIG. 1 is a cross-section view of borehole leakage assembly in the preferred embodiment of the invention

FIG. 1—Borehole Leakage Assembly Embodiment

FIG. 1 is a cross-section view of borehole leak assembly in the preferred embodiment of the invention. This leak assembly comprises the upper cap 11 and transparent bottom cup 8. An inlet is arranged in the upper part of cap 11, which is connected with the third stop valve 10, providing means for inlet of sealant fluid and control of injection pressure. In addition, the pressure sensor 12 is fixed in the upper part of the cap 11 by the second snap ring 27. Pressure data can be collected and transmitted to the control panel 19. The bottom cap 11 is hollow that allows the leakage element 22 to be screwed onto the bottom end. The leakage element 22 can be further screwed by the retainer 23 via the thread. The O-ring 26 and 24 assure against leakage around the leakage element 22.

FIG. 2—Leakage Element Embodiment

FIG. 2 is a detailed close-up of leakage element 22, which is screwed onto the bottom of cap 11 by the retainer 23 via the thread. The leakage element 22 has array holes 28 with different size and shape so as to exactly simulate the different types of leakage. The transient bottom cup 8 is secured to the upper cap 11 via the thread and to press against retainer 23. An opening is presented in the bottom of cup 8 to admit the sealant fluid into cylindrical cell 6. To satisfy the temperature-resistant and pressure-resistant requirement, the bottom cup 8 is made of a suitable material such as transient quartz glass, with which the plugging process can be directly observed.

Figure 3:
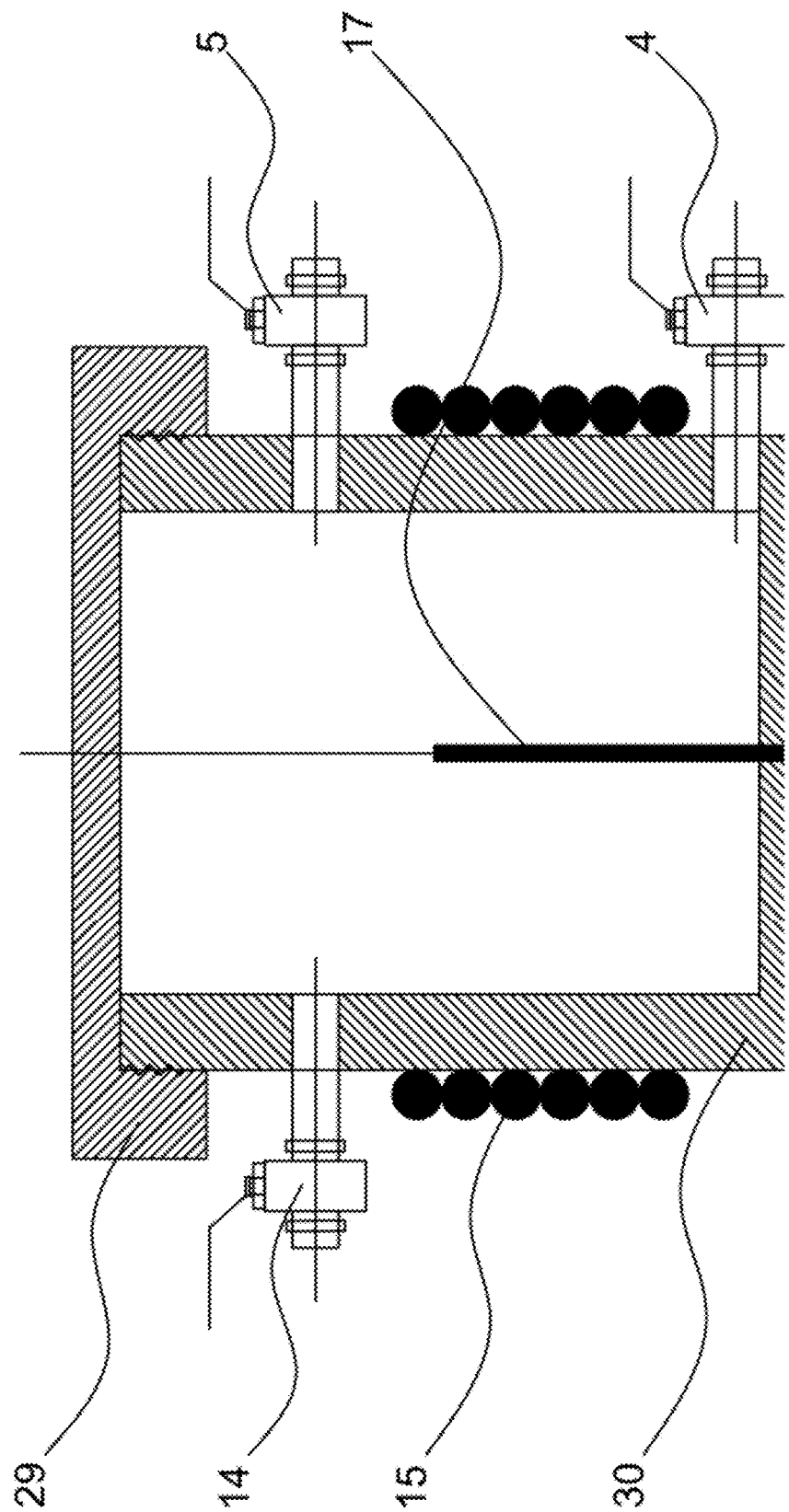
FIG. 3 is an overview of the main units of the invention

FIG. 3—Cylindrical Cell Embodiment

FIG. 3 is a cross-section view of cylindrical cell 6. Cell 6 comprises cover 29, temperature sensor 17, electromagnetic heater 15, and three control valves. Cover 29 is installed onto cylindrical cell 6 via the thread. Temperature sensor is aligned in the bottom of cell 6, which can record and transmit the temperature data to the control panel 19 by data wire 18. Two stop valves located in the upper part of cylindrical cell 6 are arranged to separately permit overflow and circulation of fluid upon plugging. Heater 15 is a special electromagnetic heating device, which is positioned radially outside the cell body to ensure stable and accurate temperature adjustment.

Figure 4:
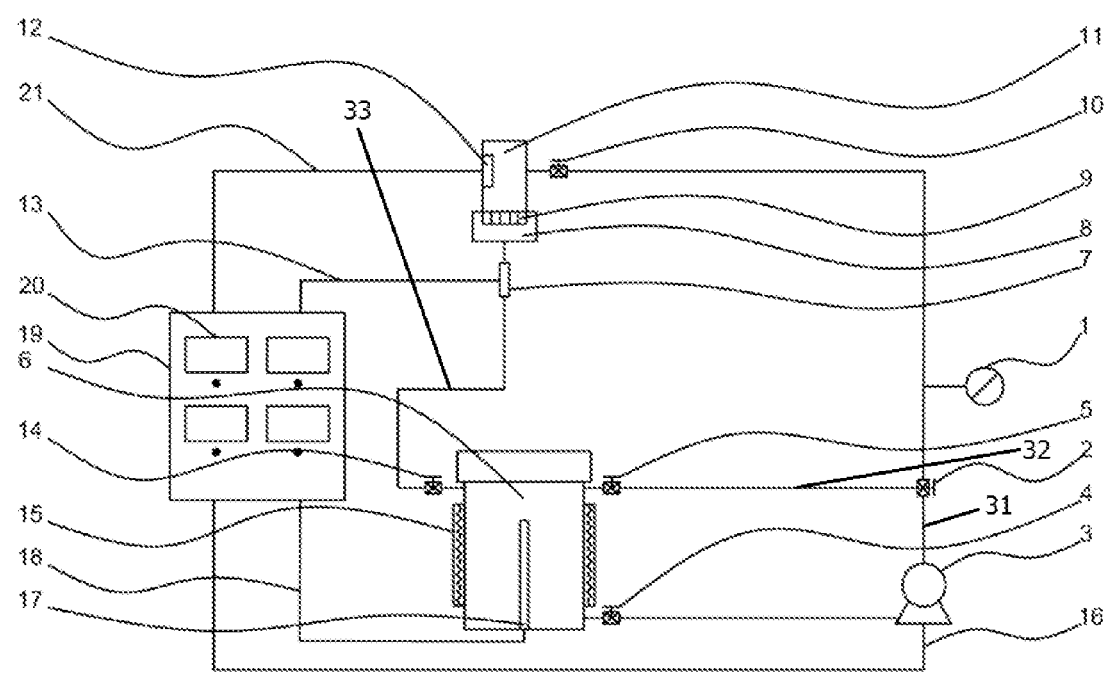
FIG. 4 is a cross-section view of cell body 30 with a cover

FIG. 4—Main Tester Units Embodiment

FIG. 4 is an overview of the main components of the present invention. The apparatus comprises the leakage assembly, cycling pipeline, data wire, functional valves, flowmeter 7, pressure gauge 1 and cylindrical cell 6. The inlet and outlet of leakage assembly are connected with pressurization pump 3 and cell 6, respectively, by means of cycling pipeline. Flowmeter 7 is arranged on the liquid return pipeline after the leakage assembly, and pressure gauge 1 is arranged on the liquid feeding pipeline before the leakage assembly. The sealant fluid enters the leakage assembly under a certain differential pressure, and then flows back into the cylindrical cell 6 through cycling pipeline installed with flowmeter 7 and pressure gauge 1. In the process, the plugging property of sealant in the downhole environment can be truly simulated. By utilizing the pressurization pump 3, the sealant fluid can be dynamically circulated, and a continuous plugging can come until that a seal is realized. In addition, an overflow unit is incorporated between cylindrical cell 6 and the first stop valve 2, so as to enable a better control of pressure upon plugging. The overflow fluid can flow into cylindrical cell 6 by opening the check valve 5, which is also helpful to adjust the pipeline pressure. Therefore, this apparatus can test a sealant under dynamic conditions encountered in the field.

In FIG. 4, all data wires such as temperature data wire, pressure data wire, and flow rate data wire are connected with the control panel 19. Meanwhile, the data acquisition system and operation software are incorporated in the panel 19 and, thus, the plugging test can be conveniently operated. Data from the run is recorded and plugging property and other characteristics of sealant fluid may be systematically evaluated.

Operation-FIG. 1-4

To perform a run of the sealability tester, a suitable leakage element 22 that corresponds exactly to actual leak status on-site should be firstly selected. Install retainer 23, and screw leakage element 22 onto the lower end of the upper cap 11. Install the visual bottom cup 8 onto the upper cap 11 via the thread and press against retainer 23. Pour sealant fluid into cylindrical cell 6, and screw cover 29 onto the cell body 30 via the thread. Close check valve 5 and the third stop valve 10. Turn on the electricity power of sealability tester. Adjust temperature as desired by activating heater 15. Open the pressurization pump 3, which is the power of the circulating sealant. Adjust the pressurization rate and make the pressure of the liquid feeding pipeline increase up to the predetermined value. If the pressure exceeds the desired value, then open check valve 5 and relieve the pressure by the overflow pipeline 32. While the pressure of the liquid feeding pipeline is stable, close the first stop valve 2, and open the third stop valve 10. The sealant fluid will inject through leakage element 22 under the condition of the desired pressure, which simulates virtually real-world circumstance encountered in the downhole leakage. As sealant fluid continuously flow through the leak, a plugging reaction linked with liquid-solid jamming transmission can happen along leak path. The pressure sensor 12 records variation of leak pressure and real-time curve of pressure can be presented in monitoring screen 20. Meanwhile, plugging process can be directly observed by the transient bottom cup 8. Flowmeter 7 records the flow velocity of sealant across leakage assembly. The sealant fluid that flows across leak site can return into cylindrical cell 6 by the return pipeline. Once a seal across the leak is formed, then the pressure recorded by pressure sensor 12 will be constant. If the seal is not formed, the first stop valve 2 can be opened to allow sealant fluid to circulate in the tester, through which a dynamic circulated plugging process may be simulated in the present invention. In addition, the pressure can be further increased by adjusting the pressurization pump 3 to examine the pressure-bearing capability of the formed seal.

Method of Testing Fluid Sealability

The specific testing steps of the present invention is as follows:

1. Assembling Leakage Components

Select a suitable leakage element 22 that can simulate the downhole string and borehole leakage. Screw leakage element 22 onto the bottom of upper cap 11. Install retainer 23 and make it press tightly on leakage element 22. Screw visual bottom cup 8 to upper cap 11 via the thread. Pour the sealant into cell body 30. Screw cover 29 onto cell body 30 via the thread.

2. Adjusting Cycling Pipeline System

Open the first stop valve 2 and the second stop valve 4 in the fluid feeding pipeline 31. Open the fourth stop valve 14 in the fluid return pipeline 33. Close check valve 5 in the overflow pipeline 32. Close the third stop valve 10 before the leakage assembly.

3. Controlling the Temperature and Pressure

Turn on the electricity power of tester. Set the testing temperature to the desired value and activate heater 15. Make sealant temperature arrive to the predetermined value. Open the pressurization pump 3, and adjust pump rate and make the sealant pressure reach the predetermined value. Pressure can be monitored by pressure gauge 1. In this process, check valve 5 can be used to cooperatively control pressure.

4. Testing Fluid Sealability

Maintain the desired pressure value. Open the third stop valve 10, and allow the sealant continuously flow through leakage assembly. Record the pressure variation by pressure sensor 12, which can reflect the plugging process. The sealant that flows across leakage element 22 returns cylindrical cell 6, which may be circulated by pressurization pump 3 to facilitate continuous plugging test. The real-time pressure data can be recorded and transmitted to control panel 19 so that the plugging property can be completely analyzed.

5. Cleaning the Testing Apparatus

Turn off the power of tester. Cool down cylindrical cell 6 to the ambient temperature. Take out the leakage element 22 from leakage assembly to further examine characteristic of seal formed in the leak site. Drain the sealant fluid from the cell 6. Pour the flush into the cell body. Open pressurization pump 3 to circulate flush for cleaning the tester.

The present disclosure is described herein using a limited number of embodiments, these specific embodiments are not intended to limit the scope of the disclosure as otherwise described and claimed herein. Modification and variations from the descried embodiments exist. In leakage assembly, for example, the bottom cup may be made of metals rather than visual quartz glass. In addition, in alternative embodiments, the electromagnetic heater positioned radially outside the pressure cell may be changed with an electric heater, and the valves may be electrically or pneumatically completely inverted.

More specifically, the following examples are given as a specific illustration of embodiments of the claimed disclosure. It should be understood that the invention is not limited to the specific details set forth in the example.

Application

Example 1

A differential pressure sealant A purchased from Jingzhou Jiahua Tech. Co., Ltd was used to measure the plugging property by means of the present invention. To simulate downhole pipe leakage on-site, a leakage element 1 with single pore whose diameter is 0.5 mm was selected. According to the operation steps described above, the test of plugging property of sealant A was conducted at 80° C. The real-time pressure variation is given in FIG. 5.

Example 2

The differential pressure sealant A purchased from Jingzhou Jiahua Tech. Co., Ltd was further used to measure the plugging property by means of the present invention. To simulate downhole pipe leakage on-site, another leakage element 2 with single square hole (length×width×depth=0.5 mm×0.5 mm×10 mm) was specifically selected. According to the operation steps described above, plugging property of sealant A was tested at 80° C., and the real-time pressure variation is shown in FIG. 5.

Example 3

A differential pressure sealant B purchased from Jingzhou Jiahua Tech. Co., Ltd was further employed to evaluate its plugging property using the present invention. Note that, sealant B is added the solid sealing material such as fiber to reinforce its sealability. To simulate downhole pipe leakage on-site, another leakage element 3 with a single rectangular hole (length×width×depth=1.0 mm×0.5 mm×10 mm) was comparatively selected. According to the operation steps described above, plugging test was conducted at 80° C. The real-time pressure variation is given in FIG. 5.

Figure 5:
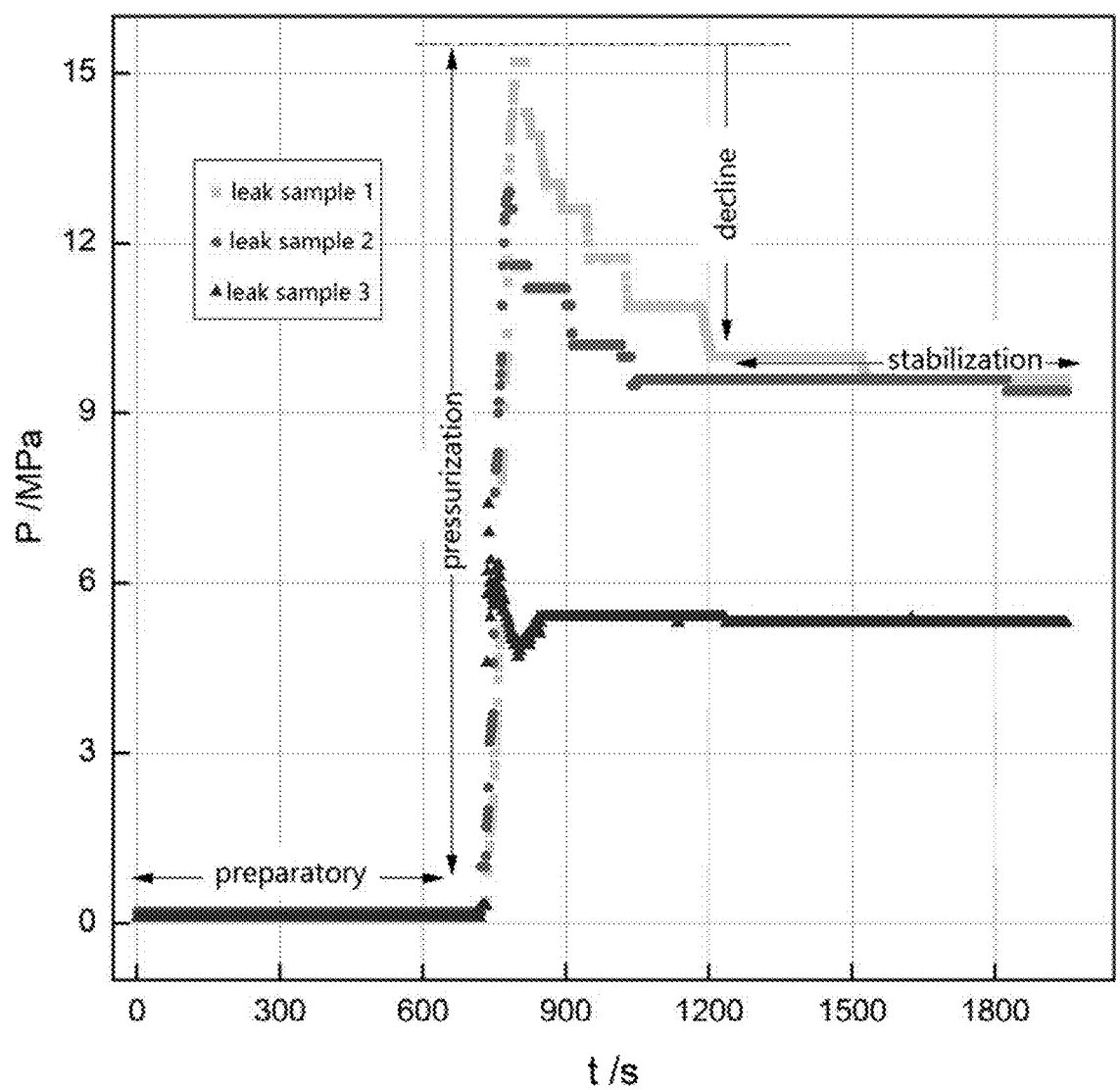
FIG. 5 is dynamic plugging curves of pressure vs. time for sealant examples in different leakage elements.

It is clear in FIG. 5 that the real-time pressure variation is well consistent for three sealant fluids, including four stages such as preparatory, pressurization, decline, and stabilization, all of which are closely related with plugging process. For example, the preparatory stage corresponds exactly to heating operation, and pressurization is linked with pumping operation. The residual stages of decline and stabilization can accurately disclose the plugging property of sealant. In principle, the shorter the decline stage lasts, the more quickly a seal forms across leak, the stronger the sealability of fluid is. It should be pointed out that the final stabilization stage can disclose a successful seal. Therefore, it can be concluded that sealant A exhibits excellent sealability to leakage element 1 & 2. Also, sealant B displays a strong plugging capability. Compared with sealant A, sealant B obviously possesses much stronger sealability, due to its successful seal on larger leakage element 3.

What is claimed is:

1. A sealability testing apparatus, comprising a tester, wherein the tester comprises:
   a leakage assembly having:
   an upper cap provided with a fluid inlet and a pressure sensor on an upper end of the upper cap, wherein said pressure sensor is capable of recording and transmitting pressure data to a control panel by a pressure data wire;
   a leakage element with different size of pores being secured into said upper cap for simulating downhole string leakage on-site;
   a retainer being in connection with a lower end of said upper cap for fixing said leakage element; and
   a visual bottom cup made of quartz glass, wherein a bottom of said visual bottom cup is open, and said visual bottom cup is temperature-resistant and pressure-resistant for observing a plugging process when sealant flows across said leakage element,
   wherein the upper cap, the leakage element, the retainer and the visual bottom cup are arranged coaxially.

2. The sealability testing apparatus of claim 1, further comprising:
   a cylindrical cell assembly having a cover and a cell body, wherein said cell body is partially filled with sealant fluid,
   an inlet is provided in an upper part of said cell body for permitting the sealant fluid to circulate,
   an outlet is provided in a bottom of said cell body and is connected with a pressurization pump;
   an electromagnetic heater is positioned radially outside said cell body for heating the sealant fluid; and
   a temperature sensor is aligned in said cell body for measuring and transmitting a temperature of the cell body.

3. The sealability testing apparatus of claim 2, further comprising:
   a cycling pipeline system having a fluid feeding pipeline, an overflow pipeline, and a fluid return pipeline,
   wherein the fluid feeding pipeline comprises a pressurization pump, a pressure gauge, and a first stop valve and a third stop valve;
   the pressurization pump is in contact with the outlet of said cell body and is applied as a pressurization tool to drive the sealant fluid to circulate in the cycling pipeline system;
   the first stop valve and the third stop valve are arranged on the fluid feeding pipeline to control an injection pressure of the sealant fluid;
   the overflow pipeline is in contact with said cell body for return of overflow fluid, which is helpful to control pipeline pressure; and
   the fluid return pipeline is in contact with said cell body for return of the overflow fluid across said leakage element, wherein a flowmeter is arranged for measuring a flow rate of the sealant fluid.

4. The sealability testing apparatus of claim 3, further comprising:
   a measurement device being in contact with said pressurization pump for measuring a pressure of the sealant fluid before the sealant fluid circulates.

5. The sealability testing apparatus of claim 2, further comprising:
   a measurement device being in contact with said cell body for measuring a temperature of the sealant fluid when the sealant fluid circulates in said cycling pipeline system.

6. The sealability testing apparatus of claim 1, further comprising:
   a control panel incorporated into a data acquisition system and an operation software, wherein said data acquisition system is connected with said tester by means of a set of data wires.

7. The sealability testing apparatus of claim 6, wherein the pressure sensor is in contact with said leakage assembly for measuring a pressure of a leak site when the sealant fluid flows through the leak site.

8. A method for determining plugging property of sealant fluid in a leak site, the method comprising the steps of:
   pouring the sealant fluid into a cell body;
   closing a stop valve before a leakage assembly starts to work;
   pumping the sealant fluid in a fluid feeding pipeline to pressurize the sealant fluid;
   opening said stop valve to allow sealant fluid circulatively flow through the leakage assembly at the desired fluid pressure;
   observing seal formed in the leak site from a visual cup;
   measuring pressures related to formation of the seal across at the leak site; and
   analyzing dynamic plugging property of said sealant fluid.

9. The method of claim 8, further comprising the step of:
   setting pressure of said sealant fluid in the fluid feeding pipeline.

10. The method of claim 8, further comprising the step of:
    setting temperature of said sealant fluid in the fluid feeding pipeline.

11. A method for determining plugging property of sealant fluid in a leak site, the method comprising the steps of:
    providing a sealability testing apparatus comprising:
    a leakage assembly having an upper cap, a leakage element, a retainer, and a visual bottom cup, wherein said retainer fixes said leakage element, and said visual bottom cup is in connection with said upper cap;
    a cylindrical cell assembly being in connection with said leakage assembly for returning the sealant fluid; and
    a pressurization pump being in connection with said cylindrical cell assembly for circulating the sealant fluid in a cycling pipeline;
    operating said pressurization pump to obtain a desired pressure;
    circulating the sealant fluid to be tested under the desired pressure;
    recording pressure variation when the sealant fluid flows through the leak site; and
    analyzing dynamic plugging property of said sealant fluid.

* * * * *